O. A. KRENKE.
YIELDABLE BEARING.
APPLICATION FILED SEPT. 10, 1917.

1,298,059.                    Patented Mar. 25, 1919.

Witness
Chas. W. Stauffer
Karl H. Butler

Inventor
Otto A. Krenke,
By
Attorneys

UNITED STATES PATENT OFFICE.

OTTO A. KRENKE, OF PORT HURON, MICHIGAN, ASSIGNOR TO ANKER HOLTH MANUFACTURING COMPANY, OF PORT HURON, MICHIGAN, A CORPORATION OF SOUTH DAKOTA.

YIELDABLE BEARING.

1,298,059.  Specification of Letters Patent.  Patented Mar. 25, 1919.

Application filed September 10, 1917. Serial No. 190,670.

*To all whom it may concern:*

Be it known that I, OTTO A. KRENKE, a citizen of the United States of America, residing at Port Huron, in the county of St. Clair, State of Michigan, have invented certain new and useful Improvements in Yieldable Bearings, of which the following is a specification, reference being had therein to the accompanying drawings.

This is an improvement in connection with a cream separator shown in Patent No. 1,006,174, granted Oct. 17, 1911, and has special reference to a yieldable bearing for the separator, such bearing being further shown in Patent No. 936,753, granted Oct. 12, 1909. The former patent shows a yieldable or flexible bearing for the spindle of the separator, said bearing including a movable bearing slidable on a fixed supporting member forming part of the main frame of the separator. A centering ring encircles the bearing ring and said centering ring is yieldably supported by a spring the tension of which may be increased or decreased by shifting the nut. The spring and its associated parts afford a lateral yielding resistance to the gyrations or lateral movements of the revolving spindle. Such construction is clearly shown in the latter patent, and the present invention aims to improve the yieldable bearing by making provision so that the bearing may be adjusted to properly and accurately center the bearing relative to a fixed member.

The adjustability of the bearing permits of the spindle of the cream separator being properly positioned in the vertical axis of the machine, so that lateral shifting thereof will be equal at all sides, thus maintaining the centrifugal separating members of the machine in proper relation to the separator bowl.

Adjustment of the yieldable bearing further compensates for certain imperfections in the manufacture of parts of the bearing, and the novel means whereby such adjustment is accomplished will be hereinafter described and then claimed.

Reference will now be had to the drawing, wherein

Figure 1:
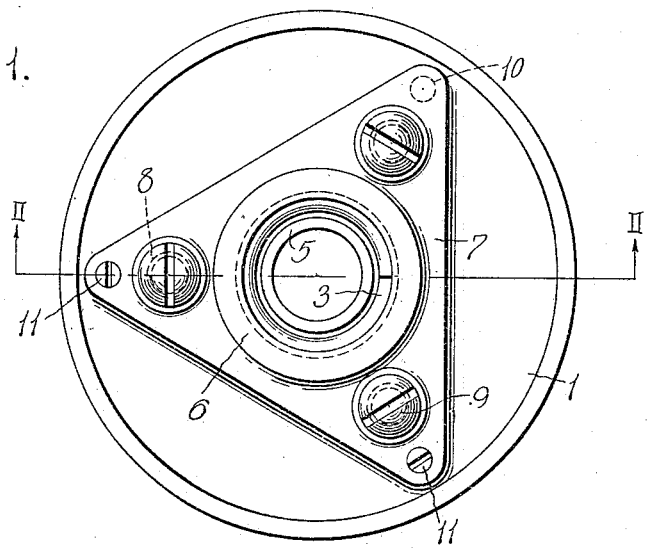
Figure 1 is a plan of the bearing.
Figure 2:
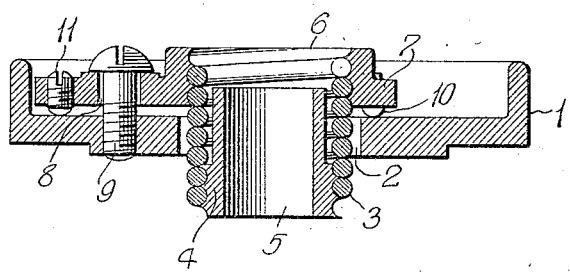
Fig. 2 is a cross sectional view of the same.

In the drawing, the reference numeral 1 denotes a fixed or stationary member corresponding either to the elements 17 in Patent No. 1,006,174 or the element —a— in Patent No. 936,753. The stationary member 1 has a central opening 2 providing clearance for a yieldable member 3, preferably in the form of a coiled spring having the convolutions thereof closely assembled so that the inner wall of the yieldable member will present threads to receive the exteriorly threaded portion 4 of a spindle bearing or bushing 5.

The upper end of the yieldable member 3 is adjustably held in an opening 6 of the centering member 7, said opening having the walls thereof screwthreaded or spirally grooved to receive the upper convolutions of the yieldable member.

The centering member 7 is preferably triangular in plan and is provided with openings 8 for screws 9 in the stationary member 1, said openings being of sufficient size to provide clearance for the screws and permit of the centering member 7 being adjusted in a lateral plane, when the screws are loose, said screws being tightened to hold the member in its adjusted position.

The centering member 7 at one corner or angle thereof, has a fixed depending lug or rock member 10 and at the other corners or angles of the center member are adjustable depending lugs or tilting members 11, preferably in the form of screws having the lower ends thereof rounded to rest on the stationary member 1 and coöperate with the stationary lug 10 in properly supporting the centering member relative to the stationary member.

With the screws 9 loose or the heads thereof out of engagement with the centering member 7, the adjustable members 11 may be adjusted to raise or lower two sides of the centering member, with the lug 10 serving as a fulcrum or pivot point for the centering member. After the member has been adjusted to properly position or center the yieldable member in the opening 2, the screws 9 may be tightened so that the heads thereof will bear on the upper face of the centering member.

From the foregoing, it will be observed that the spindle bearing 5 and the yieldable member 2 have vertical adjustment relative to the centering member 7; that the spindle bearing 5 may move in a lateral direction relative to said centering member and that by tilting the centering member 7 the axis of the spindle bearing 5 may be shifted to a proper position.

It is thought that the utility of the bearing will be apparent without further description and while in the drawing there is illustrated a preferred embodiment of my invention, it is to be understood that the structural elements are susceptible to such variations and modifications as fall within the scope of the appended claims.

What I claim is:—

1. A yieldable bearing comprising a stationary member, an adjustable centering member on said stationary member and adapted to be fixed relative thereto, a spring screwed in said centering member and a spindle bearing screwed in said spring.

2. A yieldable bearing comprising a stationary member, a centering member having a three point bearing on said stationary member and adapted to be adjusted by adjusting two of the bearing points of said centering member, means carried by said stationary member adapted for fixing said centering member relative thereto, and a yieldable member carried by said centering member.

3. A yieldable bearing comprising a stationary member, a centering member thereon having a three point bearing on said stationary member and adapted for adjustment by adjusting either one of two of said bearing points, means adapted for fixing said centering member relative to said stationary member, a yieldable member extending through said stationary member into said centering member, and a spindle bearing carried by said yieldable member.

In witness whereof I affix my signature in the presence of two witnesses.

OTTO A. KRENKE.

Witnesses:
D. L. BROWN,
F. L. POWERS.